United States Patent
Choi

(10) Patent No.: US 11,244,557 B1
(45) Date of Patent: Feb. 8, 2022

(54) EMERGENCY AND EXIGENCY SITUATION NOTIFICATION SYSTEM

(71) Applicant: Keepin Co., Ltd., Seoul (KR)

(72) Inventor: Sang Jun Choi, Seoul (KR)

(73) Assignee: KEEPIN CO., LTD., Seoul (KR)

( * ) Notice: Subject to any disclaimer, the term of this patent is extended or adjusted under 35 U.S.C. 154(b) by 0 days.

(21) Appl. No.: 17/171,054

(22) Filed: Feb. 9, 2021

(30) Foreign Application Priority Data

Jul. 15, 2020 (KR) .................. 10-2020-0087777

(51) Int. Cl.
| | |
|---|---|
| *G08B 31/00* | (2006.01) |
| *G08B 21/02* | (2006.01) |
| *G10L 15/22* | (2006.01) |
| *G10L 25/90* | (2013.01) |
| *G08B 25/10* | (2006.01) |
| *G10L 25/51* | (2013.01) |
| *G08B 17/00* | (2006.01) |

(52) U.S. Cl.
CPC ............. *G08B 31/00* (2013.01); *G08B 21/02* (2013.01); *G08B 25/10* (2013.01); *G10L 15/22* (2013.01); *G10L 25/51* (2013.01); *G10L 25/90* (2013.01); *G08B 17/00* (2013.01)

(58) Field of Classification Search
CPC ........ G08B 31/00; G08B 21/02; G08B 25/10; G08B 17/00; G10L 15/22; G10L 25/51; G10L 25/90
USPC ...................................................... 340/523
See application file for complete search history.

(56) References Cited

U.S. PATENT DOCUMENTS

| 6,144,310 A | * | 11/2000 | Morris | .................. G08B 21/12 340/505 |
|---|---|---|---|---|
| 7,126,467 B2 | * | 10/2006 | Albert | .................. A61B 7/003 340/521 |
| 10,613,505 B2 | * | 4/2020 | Aljuaid | .............. G05B 23/0221 |
| 2009/0189983 A1 | * | 7/2009 | Brumfield | ........ G08B 13/19613 348/159 |
| 2012/0038462 A1 | * | 2/2012 | Adler | ....................... H04Q 9/00 340/10.1 |
| 2013/0331058 A1 | * | 12/2013 | Harvey | .................. H04W 4/90 455/404.2 |
| 2021/0183406 A1 | * | 6/2021 | Rogers | .................. G16Y 20/10 |

FOREIGN PATENT DOCUMENTS

| KR | 10-0807757 B1 | 2/2008 |
|---|---|---|
| KR | 10-2016-0004527 A | 1/2016 |
| KR | 10-2016-0037326 A | 4/2016 |
| KR | 10-2018-0093596 A | 8/2018 |

* cited by examiner

*Primary Examiner* — John A Tweel, Jr.
(74) *Attorney, Agent, or Firm* — KORUS Patent, LLC; Seong Il Jeong

(57) ABSTRACT

The present invention determines whether a fire or disaster has occurred in various fields based on voices in an exigency situation and surrounding environmental sounds, and automatically transmits an alarm, so that it can detect the occurrence of a disaster rapidly and accurately. The system of the present invention is installed in a building or is provided as a program of a computer or an application of a smartphone, so that the installation and maintenance of the system are simple.

6 Claims, 5 Drawing Sheets

EMERGENCY AND EXIGENCY SITUATION NOTIFICATION SYSTEM

CROSS-REFERENCE TO RELATED APPLICATION

This application claims the benefit of Korean Patent Application No. 10-2020-0087777 filed on Jul. 15, 2020, which is hereby incorporated by reference herein in its entirety.

BACKGROUND

1. Technical Field

The present invention relates to an emergency and exigency situation notification system. More specifically, the present invention relates to an emergency and exigency situation notification system that recognizes the sounds of a surrounding environment, and, when there is a difference between the recognized sounds and normal stable sounds, determines that a situation in question is an emergency situation and/or an exigency situation and then issues an alarm.

2. Description of the Related Art

In the event of a fire, a disaster, or various emergencies, alarm apparatuses are widely used to notify surrounding people of the situation so that those staying indoors can evacuate rapidly. A representative of these alarm apparatuses is a fire alarm apparatus. Fire alarm apparatuses include automatic alarm apparatuses that recognize an emergency situation through various sensors and sound an alarm, and manual alarm apparatuses that sound an alarm when a human recognizes an emergency situation and then presses a button. In addition, in industrial sites, there are emergency stop buttons that can prevent the spread of damage to people and property by forcibly stopping currently operating equipment in an emergency situation.

As an example of such an alarm apparatus, according to Korean Patent Application No. 10-2014-0082914, a fire alarm apparatus 100' includes a sound emission unit 110' composed of a plurality of speakers 112', a communication unit 120' configured to receive a fire alarm signal, as shown in FIG. 5(a), and a control unit 130' configured to allow a fire alarm sound to be output to at least one of the plurality of speakers when the fire alarm signal is received through the communication unit, and can emit a fire alarm sound. The fire alarm signal is a signal requesting the start of operation of the fire alarm apparatus 100, i.e., the emission of a fire alarm sound. As shown in FIG. 5(b), when an occupant, including a manager, detects the occurrence of a fire and presses a surrounding fire alarm switch, or when the fire detector 500', which is an automatic alarm apparatus, detects the occurrence of a fire, a fire alarm signal is generated and transmitted to the fire alarm apparatus 100'.

In order to minimize damage to people and property in the event of a fire, it is important to notify people of the fact of the fire as soon as possible. Accordingly, anyone should have quick access to a fire alarm switch that activates an indoor fire alarm system. However, fire alarm switches are generally installed in stairs or corridors in apartments, buildings, factories, and the like. Accordingly, if a person does not recognize the location of a fire alarm switch, a fire alarm apparatus cannot be operated. In addition, in the case of a normal person, the position of a fire alarm switch can be easily identified and quickly moved to the position where the fire alarm switch is installed. In contrast, in the case of a visually impaired person, the position of a fire alarm switch cannot be easily recognized. Accordingly, a disadvantage arises in that it is difficult for the visually impaired person to access the fire alarm switch. In addition, in the case of people with disabilities, the elderly, and young kids, it is difficult to quickly move to the corresponding position in a disaster situation even if the position of the fire alarm switch is recognized.

Furthermore, in the case of people with disabilities, the elderly, and young kids, it is difficult to rapidly move to a corresponding position in a disaster situation even when he or she recognizes the position of a fire alarm switch.

Meanwhile, when people work in factories, fields, or construction sites, there are many risk factors in addition to fire. If a conveyor that is running in real time fails and stops, failure to recognize it can result in injury. If a large industrial machine such as a crane falls down, a building collapses, or bulky items are spilled, loss of life may occur. In order to prepare for such an emergency situation, "prevention" is essential. In the event of an emergency, in most cases, an alarm is sounded, a red lamp is flashed, or an operator yells or commands, thereby informing the surroundings of the occurrence of the emergency.

However, this scheme requires a person to manually operate an alarm apparatus and the work of protecting human life should be performed first, so that a problem arises in that the time to sound an alarm becomes late or a person has to go through several routes to sound an alarm. As a result, there are cases where important golden timing is missed due to a late warning to a management department or related organization.

In order to accurately determine whether an abnormality or dangerous situation occurs in various environments, it is necessary to establish a system capable of collecting all sounds generated in an environment and determining whether an abnormality has occurred based on the collected sounds as well as a physical device such as a fire detector.

In view of the above problems, the present inventor has developed an emergency and exigency situation notification system that, when a fire or disaster situation or the like occurs, accurately determines the fire or disaster situation or the like to be an emergency situation and automatically issues an alarm.

SUMMARY

An object of the present invention is to provide an accurate and simple emergency and exigency notification system that recognizes the sounds of a surrounding environment, and, when there is a difference between the recognized sounds and normal stable sounds, determines that a situation in question is an emergency situation and/or an exigency situation and then issues an alarm.

According to an aspect of the present invention, there is provided an emergency and exigency situation notification system, the system comprising a control unit configured to determine emergency and exigency situations, wherein the control unit is connected to a reception unit and an alarm drive unit and refers to a database (DB); wherein the reception unit receives sounds, including human voices and environmental sounds of objects other than humans, which are collected in a surrounding environment; and wherein the control unit includes an emergency situation control unit configured to determine that a situation in question is an emergency situation when an abnormality occurs in the environmental sound data other than human voices collected by the reception unit, an exigency situation control unit configured to determine that a situation in question is an exigency situation when a specific term indicative of danger is included in the voices, and a data control unit configured to secure and update data stored in the DB.

The data control unit may receive sounds in a calm and normal state from an environment in which the emergency and exigency notification system is installed, may obtain or update the stability data, and may acquire or update terms representative of danger.

The emergency situation control unit, when the environmental sound data received by the reception unit is included in stability data learned in advance and stored, may determine that a situation in question is in a calm state and decrease an emergency situation data index, and, when the environmental sound data received by the reception unit is not included in stability data learned in advance and stored, may increase the emergency situation data index and transmit an alarm signal to an alarm drive unit when a final value of the emergency situation data index reaches a predetermined maximum emergency situation index value.

The exigency situation control unit may compare the sound data received by the reception unit with exigency data indicative of exigency situations stored in advance, and, when the received sound data does not contain a specific term indicative of danger, may determine that a situation in question is in a calm state and decreases an exigency situation data index, and, when the received sound data contains a specific term indicative of danger, may increase the exigency situation data index and transmit an alarm signal to the alarm drive unit when a value of the exigency situation data index reaches a predetermined maximum exigency situation index value.

The exigency situation control unit may assign a weight to the exigency situation data index when it is determined that a pitch of the sound data is trembling, high tone, or high decibel.

The emergency and exigency situation notification system may be provided as at least one of equipment installed inside a building, a program of a computer, and an application of a mobile phone.

According to another aspect of the present invention, there is provided a method of providing notification of an emergency and an exigency situation using the emergency and exigency situation notification system, the method including:

(a) a method in which the emergency situation control unit, when the environmental sound data received by the reception unit is included in stability data learned in advance and stored, determines that a situation in question is in a calm state and decreases an emergency situation data index, and, when the environmental sound data received by the reception unit is not included in stability data learned in advance and stored, increases the emergency situation data index and transmits an alarm signal to an alarm drive unit when a final value of the emergency situation data index reaches a predetermined maximum emergency situation index value; and/or (b) a method in which the exigency situation control unit compares the sound data received by the reception unit with exigency data indicative of exigency situations stored in advance, and, when the received sound data does not contain a specific term indicative of danger, determines that a situation in question is in a calm state and decreases an exigency situation data index, and, when the received sound data contains a specific term indicative of danger, increases the exigency situation data index and transmits an alarm signal to the alarm drive unit when a value of the exigency situation data index reaches a predetermined maximum exigency situation index value.

According to another aspect of the present invention, there is provided an emergency and exigency situation notification system, the system comprising a control unit configured to determine emergency and exigency situations, wherein the control unit is connected to a reception unit and an alarm drive unit and refers to a database (DB); wherein the reception unit receives sounds, including human voices and environmental sounds of objects other than humans, which are collected in a surrounding environment; wherein the control unit includes an emergency situation control unit configured to determine that a situation in question is an emergency situation when an abnormality occurs in the environmental sound data other than human voices collected by the reception unit, an exigency situation control unit configured to determine that a situation in question is an exigency situation when a specific term indicative of danger is included in the voices, and a data control unit configured to secure and update data stored in the DB; and wherein the emergency situation control unit, when the environmental sound data received by the reception unit is included in stability data learned in advance and stored, determines that a situation in question is in a calm state and decreases an emergency situation data index, and, when the environmental sound data received by the reception unit is not included in stability data learned in advance and stored, increases the emergency situation data index and transmits an alarm signal to an alarm drive unit when a final value of the emergency situation data index reaches a predetermined maximum emergency situation index value.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
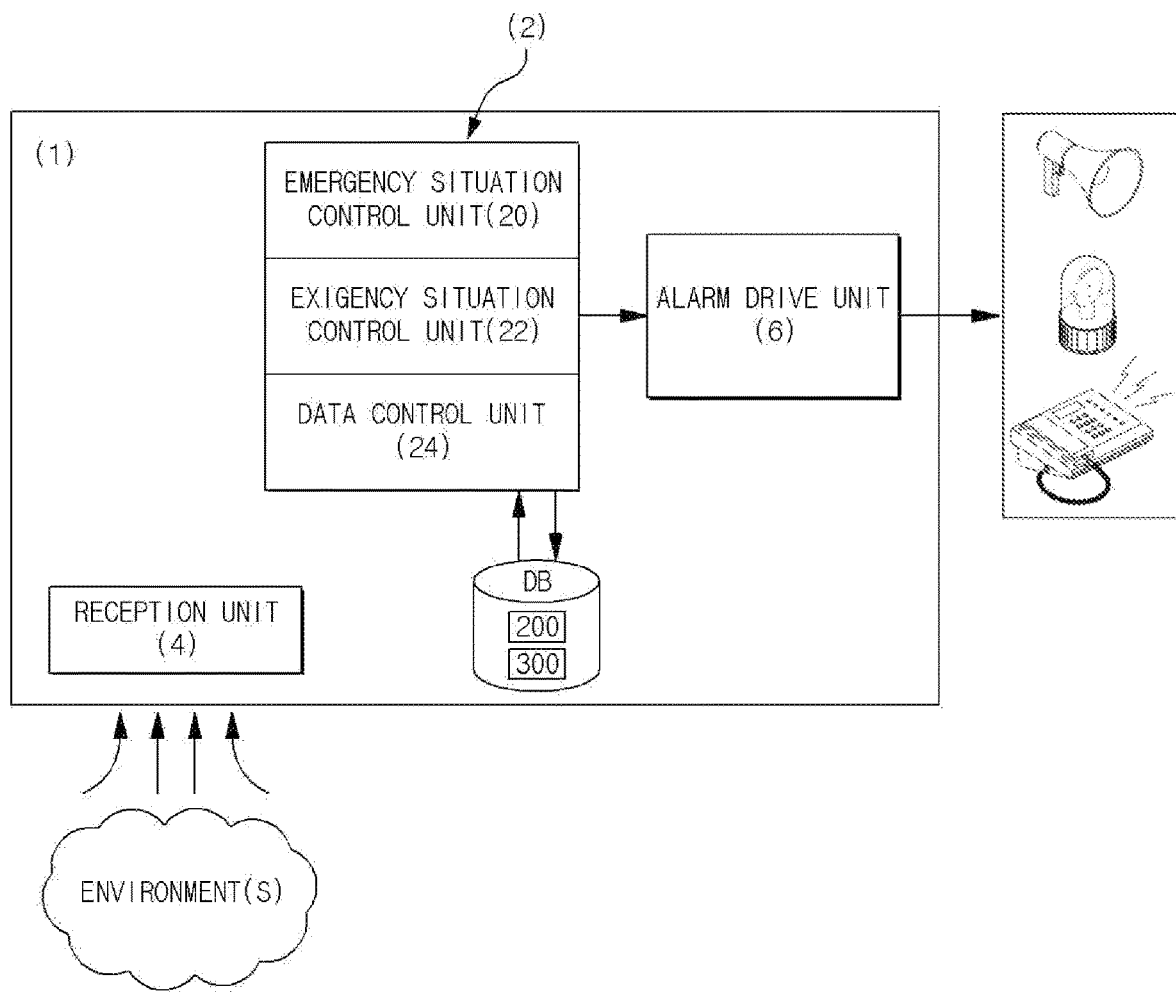
FIG. 1 is a block diagram of an emergency and exigency situation notification system according to the present invention.

Embodiments of the present invention will be described below with reference to the accompanying drawings. In this process, the thicknesses of the lines or the sizes of the components shown in the drawings may be exaggerated for the sake of clarity and convenience of description.

Furthermore, the terms to be described later are terms defined by taking into consideration the functions thereof in the present invention, which may vary according to the intention or custom of a user or an operator. Accordingly, the definitions of these terms should be made based on the context throughout the present specification.

In addition, the following embodiments are not intended to limit the scope of the present invention, but are merely illustrative of the components presented in the claims of the present invention. Embodiments that are included in the technical spirit of the present invention throughout the specification of the present invention and include elements that can be substituted for the components of the claims as equivalents may be included in the scope of the present invention.

FIG. 1 is a diagram showing the configuration of an emergency and exigency situation notification system 1 according to the present invention. The emergency and exigency situation notification system 1 includes a control unit 2 that determines emergency and exigency situations. The control unit 2 is connected to a reception unit 4 and an alarm drive unit 6, and refers to a database DB.

The reception unit 4 receives all sounds input from a surrounding environment S. The environment S should be interpreted in a broad sense including indoor and outdoor areas as well as places such as a home, a building, a factory, and a field. The sounds include all sounds generated in the environment S, and a plurality of sensors configured to receive sounds may be disposed adjacent to a wall, a ceiling, or a machine. In the present invention, the sounds are based on the concept that includes both voices resonating and uttered in human vocal cords and "environmental sounds" from non-human subjects a machine, a building, a vehicle, equipment, a computer, and noise. However, the distinction between a voice and an environmental sound is not clear depending on the environment, and background voices such as a crowd's roaring or laughter may belong to the environmental sounds as noise.

When the alarm drive unit 6 receives an alarm notification signal from the control unit 2, it transmits a driving signal to an external alarm generation device such as a siren, an operator or manager's mobile phone, a red light lighting device, or an alarm system unique to a related department or organization.

The control unit 2 of the present invention includes an emergency situation control unit 20 and an exigency situation control unit 22. As will be described later, the emergency situation control unit 20 mainly determines a case where an abnormality occurs in the external environmental sound to be an emergency situation, and the exigency situation control unit 22 determines a case where a specific term indicating danger is included in sounds to be an exigency situation. The terms "emergency" and "exigency" are distinguished from each other for the sake of ease of the description of the present invention and understanding of the present invention. As long as a voice and an environmental sound are used, embodiments using any terms such as "urgency" and "disaster" are included in the scope of the present invention.

The control unit 2 includes a data control unit 24. The data control unit 24 collects, updates, and learns stability data 200 and exigency data 300.

In the present invention, a DB includes the stability data 200. The stability data 200 is data that is updated and evolved by learning via a deep learning method using artificial intelligence.

Figure 2:
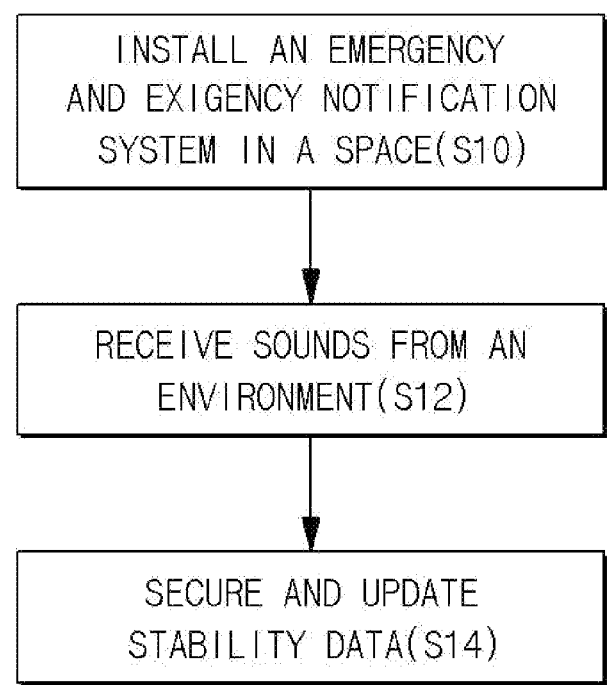
FIG. 2 is a flowchart showing the flow of learning stability data according to the present invention.

To this end, as shown in FIG. 2, first, the emergency and exigency situation notification system 1 of the present invention is placed in a space where the system 1 will be installed at step S10. Thereafter, sounds are received from an environment S at step S12. Thereafter, the data control unit 24 acquires or updates stability data based on the sounds at step S14. Steps S12 and S14 are repeated, and learning time may take several hours to several weeks. The stability data is data obtained in a calm state in which no emergency or exigency situation occurs in the environment S. In the case of a factory, the stability data may be usual machinery sounds, work sounds, and intermittent human voices. In the case of a market or school, the stability data may usually be human voices. In contrast, at night, it will be vehicle driving sounds heard from a distance instead of human voices. At a construction site, it will be sounds of conveyance machines such as working vehicles and conveyors, hitting sounds, welding sounds, and sounds of construction workers.

The stability data 200 collected in this way is converted into vibration or frequency. The specific amplitude, peak, and intensity of vibration or frequency become indicators showing the stable state of the specific environment S. Since the stability data 200 varies depending on the environment S and the same environment may vary over time, it is desirable to periodically perform learning.

The DB of the present invention includes the exigency data 300. The exigency data 300 is mainly based on terms of a person found in a dangerous situation. For example, when a fire scene is assumed, examples of the exigency data 300 may be the terms "Fire!" and "Call 911!." Alternatively, they may be "Accident Occurred" and "Press the Emergency Bell!" in a factory line. Alternatively, they may be the terms "Police" and "Help Me!" when a threat comes to the body. The exigency data 300 includes not only Korean terms, but also all corresponding foreign language terms such as English terms and Chinese terms. Although the exigency data 300 may be pre-recorded data, voices may be extracted, learned, and stored from sound data in the environment S where it is assumed that an abnormal condition has occurred or at a site where an actual emergency situation has occurred.

The control unit 2 of the present invention is characterized in that it determines whether the "emergency" or "exigency" intensity of the sounds collected in the environment S is equal to or higher than a predetermined threshold.

When the emergency and exigency situation notification system 1 of the present invention is installed in the environment S after learning, it operates as follows and provides the notification of the abnormal situation of the environment S. "Emergency" situation detection and "exigency" situation detection may be performed independently of each other as well as in parallel with each other.

The emergency and exigency situation notification system 1 of the present invention may be installed as an independent apparatus inside a building or workplace, or may be installed on a computer in an indoor space or the platform of a central control station. Furthermore, it may be supplied as an application and installed on the smartphone of a task manager. It is connected to an external sensor or alarm apparatus over a wired or wireless network.

Figure 3:
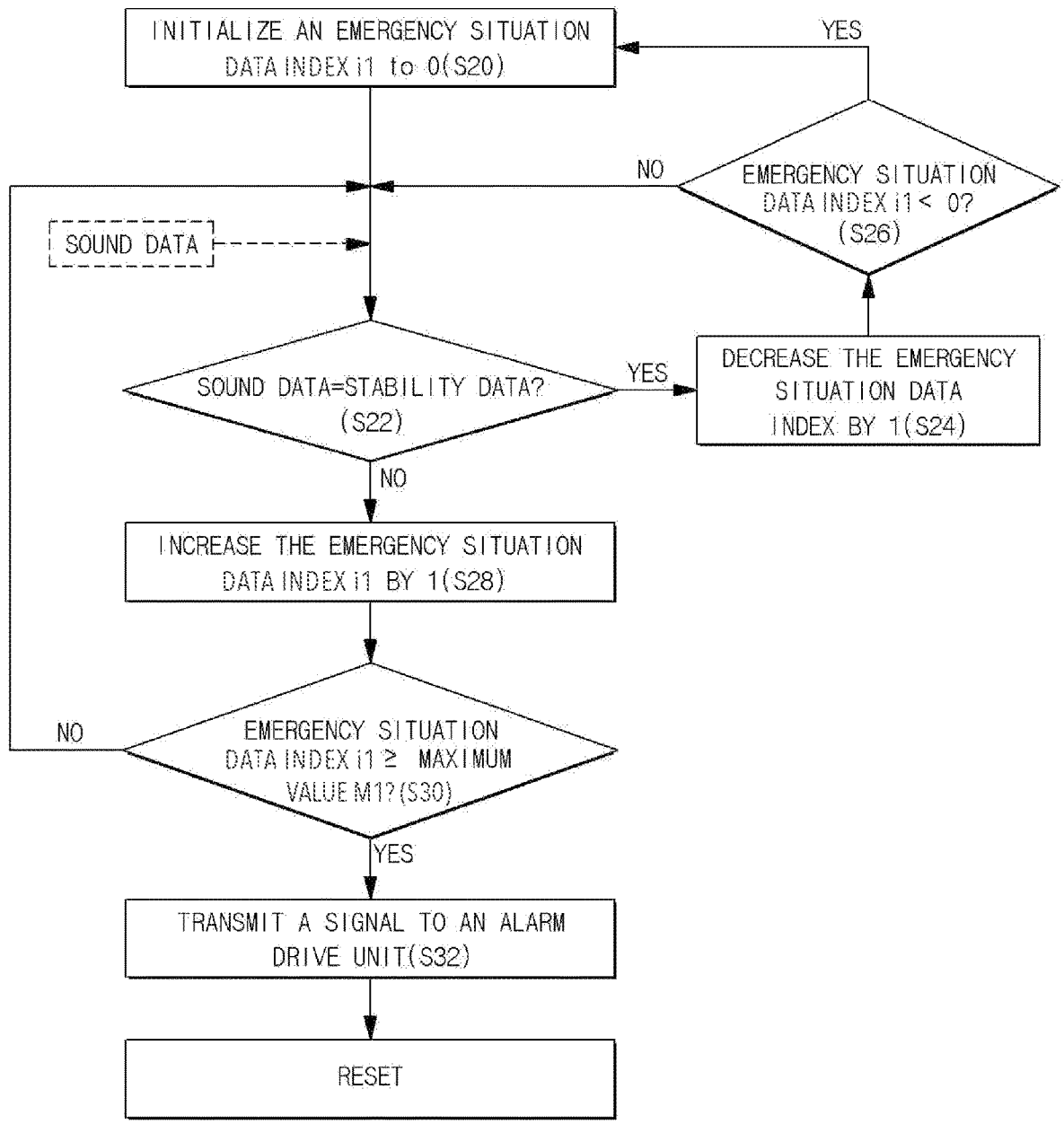
FIG. 3 is a flowchart showing the flow of an emergency notification operation according to the present invention.

The emergency situation notification operation of the present invention will be described with reference to the flowchart of FIG. 3.

First, the emergency situation control unit 20 of the control unit 2 initializes an emergency situation data index i1 to "0" at step S20. Thereafter, the sound data received by the reception unit 4 is compared with the previously learned and stored stability data 200 at step S22. If the sound data contains or is the same as the stability data 200, it is determined that a situation in question is in a normal calm state, and 1 is subtracted from the emergency situation data index i1 at step S24. The identity of the data is not instantaneous identity, but refers to actual identity between consecutive pieces of data over at least a few seconds. Then, it is determined whether the value of the emergency situation data index i1 is negative at step S26. If the result of the determination is YES, the process returns to step S20. In contrast, if the result of the determination is NO, the process returns to step S22 while maintaining the index i1 reduced by −1. In either case, whether or not the environment S is in a normal state is repeatedly determined.

Meanwhile, if the sound data does not contain the stability data 200 at step S22, it is determined that the emergency situation has occurred and the emergency situation data index i1 is increased by 1 at step S28. For example, this case corresponds to a case where a mechanical sound stops suddenly or a large vibration occurs in a factory line. Thereafter, it is determined whether the emergency situation data index i1 has reached a predetermined maximum emergency situation index value M1 at step S30. When a situation in which the emergency situation data index i1 is increased by 1 is accumulated, it is determined that an actual emergency situation has occurred. If a situation falls into a normal working category or is a simple malfunction even when a machine suddenly stops operation or operates with a loud noise, appropriate action can be taken immediately, and thus the maximum value of the emergency situation data index i1 is not reached. In addition, when the environment S is recovered to a normal state through a series of measures, the process proceeds from step S22 to step S24, and thus the index is reduced. Accordingly, the emergency intensity of the environment S will be weakened, and the maximum value will not be reached.

When the maximum value is not reached, the process returns to step S22 and continuously monitors and reflects whether the environment S is in an abnormal state. However, when the emergency situation data index i1 reaches the maximum value M1, the emergency situation control unit 20 transmits a signal to the alarm drive unit 6 at step S32, and the alarm apparatus transmits an alarm. When a machine to be always operated is stopped for a predetermined time or high vibration continues to occur, the index continues to be increased at step S28 and reaches the maximum value M1, and an alarm is issued to the outside. As described above, according to the present invention, the degree of emergency of the environment S is not immediately determined, but it is objectively determined by comparing the sound data and the stability data 200 over a predetermined period of time and selectively increasing and decreasing the index i1. Accordingly, it may be possible to accurately classify and provide notification of normal and emergency conditions without an error, thereby performing disaster prevention effectively and rapidly.

Figure 4:
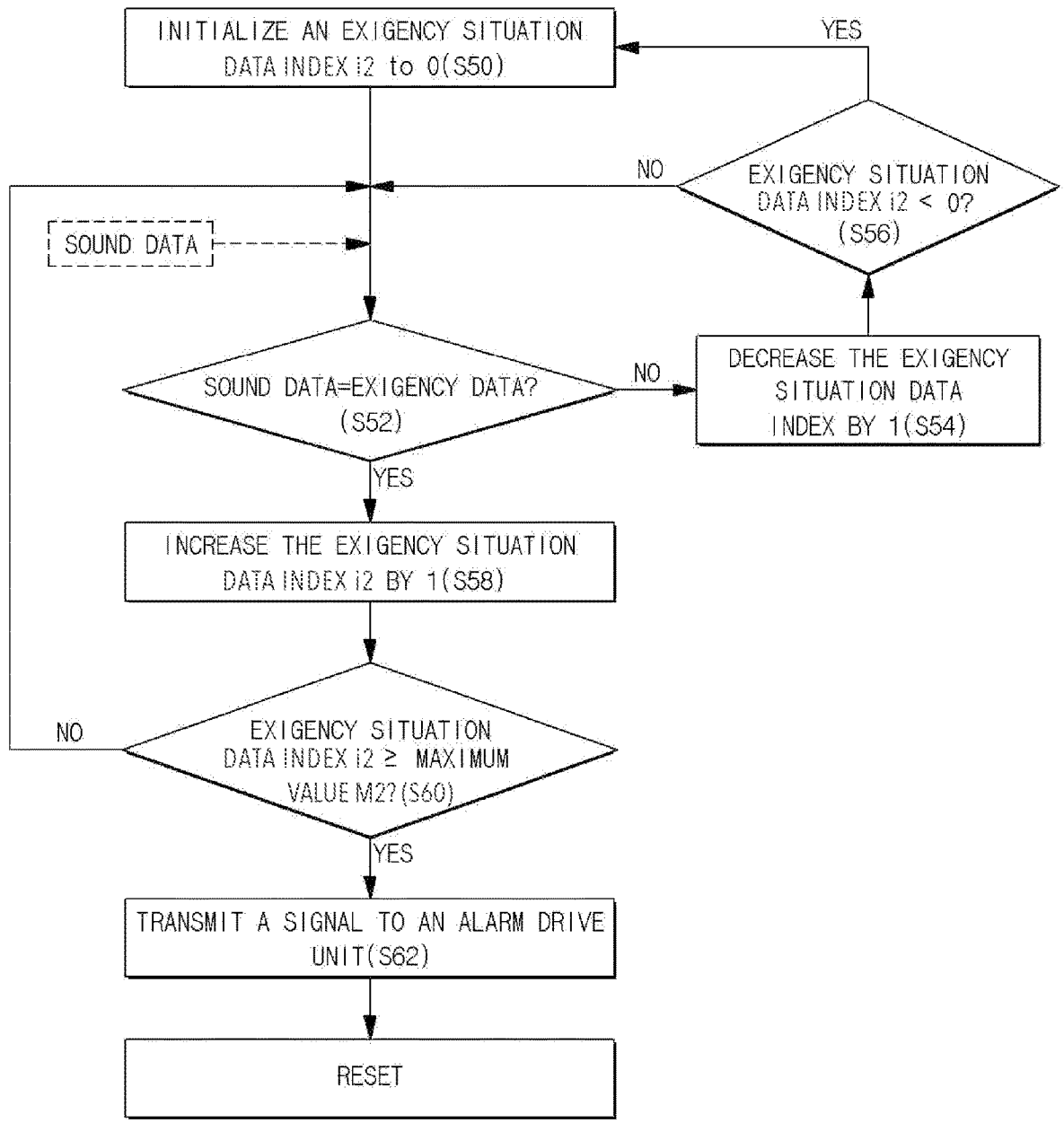
FIG. 4 is a flowchart showing the flow of an exigency notification operation according to the present invention.
Figure 5A:
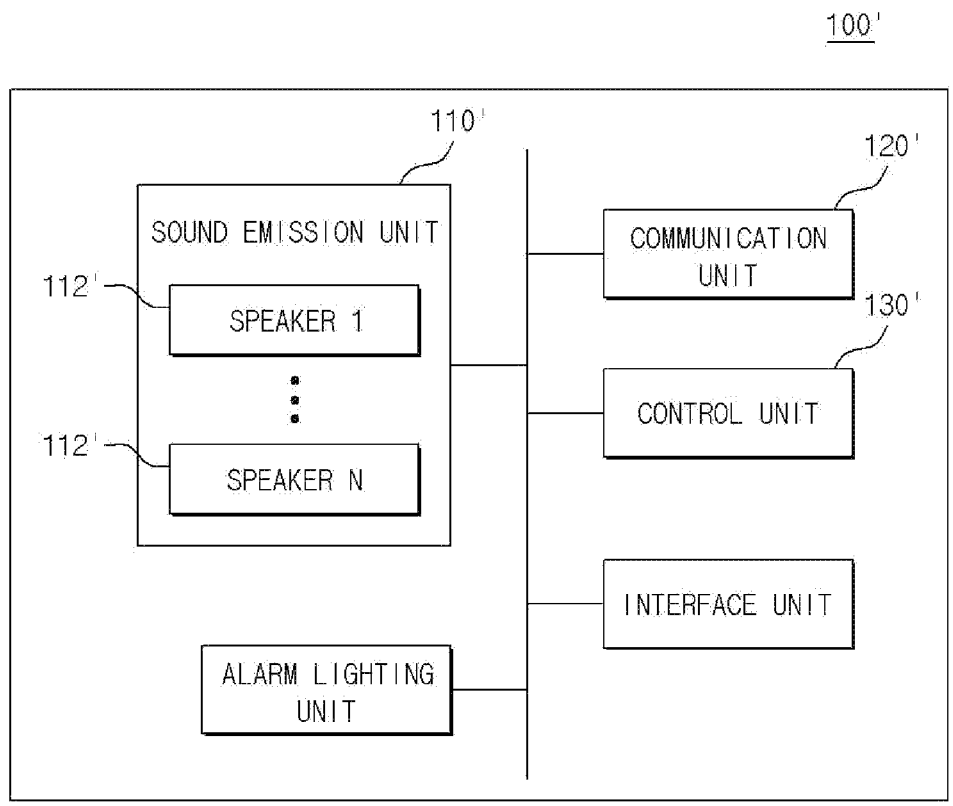
FIGS. 5(a) and 5(b) are block diagrams showing an example of a conventional fire alarm apparatus.
Figure 5B:
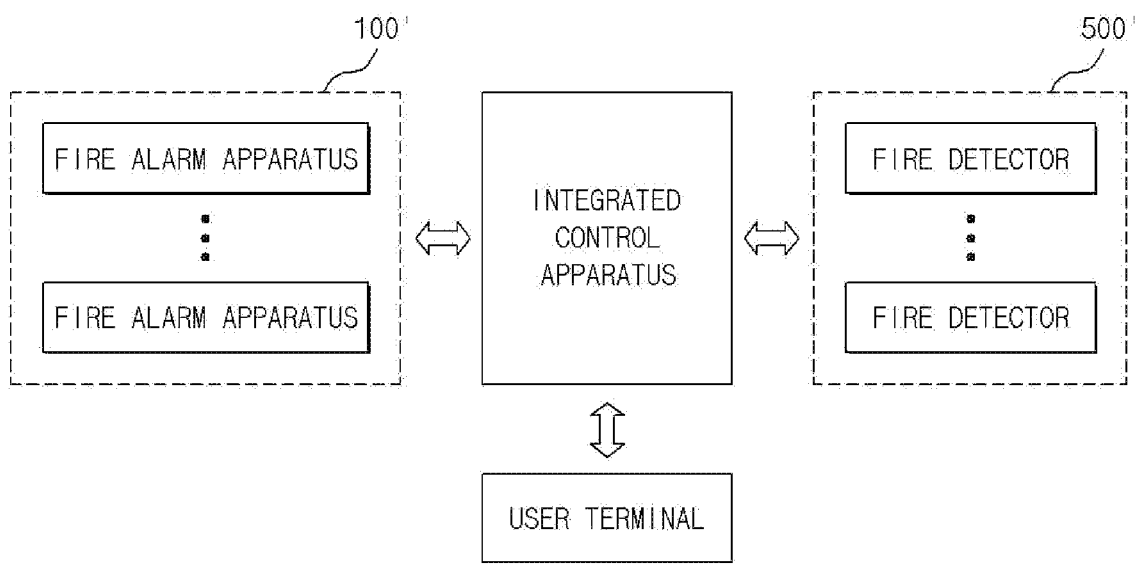

Next, an exigency situation notification operation according to the present invention will be described with reference to the flowchart of FIG. 4. The logic of the exigency notification operation is similar to the logic of the emergency notification operation described above.

First, the exigency situation control unit 22 of the control unit 2 initializes an exigency situation data index i2 to "0" at step S50. Thereafter, the sound data received by the reception unit 4 is compared with the previously stored exigency data 300 at step S52. If the sound data does not contain or is not the same as the exigency data 300, it is determined that a situation in question is in a normal calm state, and 1 is subtracted from the exigency situation data index i2 at step S54. Then, it is determined whether the value of the exigency situation data index i2 is negative at step S56. If the result of the determination is YES, the process returns to step S50. In contrast, if the result of the determination is NO, the process returns to step S52 while maintaining the index i1 reduced by −1. In either case, whether or not the environment S is in a normal state is repeatedly determined.

Meanwhile, if the sound data contains or is the same as the exigency data 300 at step S52, it is determined that the exigency situation has occurred, and the exigency situation data index i2 is increased by 1 at step S58. For example, this case is a case where a fire broke out in a building and the sound of "It's a fire!" has been collected. Thereafter, it is determined whether the exigency situation data index i2 has reached a predetermined maximum exigency situation index value M2 at step S60. When a situation in which the exigency situation data index i2 is increased by 1 is accumulated, it is determined that an actual exigency situation has occurred. The maximum value M2 can be reached if the term "It's fire!" and the term "Evacuate" and "Call 911" are collected in succession or if the term "It's fire" shouted out by many people are collected simultaneously. However, mischievous or deliberate shouts are difficult to continue, and in case of a minor fire, it can be extinguished immediately. When the environment S is recovered to a normal state, the process proceeds from step S52 to step S54, and thus the index is reduced. Accordingly, the exigency intensity of the environment S will be weakened, and the maximum value M2 will not be reached.

If the maximum value is not reached, the process returns to step S52 and continuously monitors and reflects whether the environment S is in an abnormal state. In contrast, if the exigency situation data index i2 reaches the maximum value M2, the exigency situation control unit 22 transmits a signal to the alarm drive unit 6 at step S62, and the alarm apparatus sends an alarm sound, and the system is reset.

When a fire breaks out and the terms "It's a fire," "fire," "evacuate," and "help" are collected sequentially, the index i2 continues to be increased and reaches at least 4. If this value is more than the set maximum value M2, an alarm is issued to the outside. As described above, according to the present invention, the degree of emergency of the environment S is objectively determined in such a manner that the index i2 is selectively increased and decreased by comparing the sound data and the exigency data 300 over a predetermined time. Accordingly, it may be possible to accurately classify and provide notification of normal and critical conditions without an error and to perform disaster prevention effectively and rapidly.

In the above description, the value of the maximum index that is used to warn of an emergency or exigency situation is set to a value varying depending on the environment S. Meanwhile, in a sensitive environment where stability is important, maximum stability may be ensured by setting the value to a value equal to or close to 1.

The devices that receive an alarm signal from the alarm drive unit 6 are not limited, but it is desirable to secure stability by installing, e.g., an emergency switch or button and stopping the operation of a malfunctioning machine using an artificial intelligence (AI) method.

Since the emergency situation control unit 20 and exigency situation control unit 22 of the present invention described above function to complement each other, it is preferable that they perform their functions at the same time. However, only one control unit may be installed depending on the environment S. In addition, in the case where they perform their functions at the same time, it may be possible to send an alarm when both indices i1 and i2 reach their maximum values M1 and M2, respectively. In the emergency and exigency situation notification system 1 of the present invention, the sounds collected in the environment S are basically processed by the control unit 2 in two flows. However, it should be noted that any one of the flows has priority. For example, in a normal case, the exigency situation data index i2 increases first, and then the emergency situation data index i1 increases later. However, there may be various situations, such as a situation in which the latter decreases first and the former continues to increase.

Additionally, in the case of an exigency term, there are many cases where it does not have a normal pitch but has trembling, high tone, or high decibel. Accordingly, in this case, a weight may be added or the index i2 may be multiplied by an appropriate weight without simply increasing the index i2 by 1 at step S58, and then it may be determined whether the maximum value M2 is reached at step S60.

Furthermore, in the present invention, the emergency situation control unit 20 having a wide range of sound data comparison may be used as the default logic of the control unit 2, and the exigency situation control unit 22 may be provided as an auxiliary module to be added thereto.

According to the present invention described above, the sounds generated in the environment S have been learned, and then it is objectively determined whether an emergency or exigency situation has occurred based on human voices and/or environmental sounds. Accordingly, abnormal situations may be accurately determined and then notification thereof may be provided, so that disasters may be prevented and human loss may be minimized. In addition, the system of the present invention may be installed as an independent device or may be simply installed on a computer or an administrator's smartphone, and thus advantages arise in that monitoring and maintenance are easy and program changes and updates are also very convenient.

The emergency and exigency situation notification system of the present invention may accurately and rapidly determine whether an abnormality or emergency situation occurs.

The emergency and exigency situation notification system of the present invention exhibits effects in that the installation of the system is convenient and the maintenance and repair of the system is simple.

Although the present invention has been described based on sound, this has been presented as an example and may be applied to objects including vibration, waves, light, and the like.

While the present invention has been described above through the specific embodiments, this is intended to describe the present invention in detail. The present invention is not limited thereto, and modifications or improvements may be made by those of ordinary skill in the art within the technical spirit of the present invention.

All simple modifications and alterations of the present invention fall within the scope of the present invention, and the specific protection range of the present invention is defined based on the appended claims.

What is claimed is:

1. An emergency and exigency situation notification system, the system comprising a control unit configured to determine emergency and exigency situations, wherein the control unit is connected to a reception unit and an alarm drive unit and refers to a database (DB);

wherein the reception unit receives sounds, including human voices and environmental sounds of objects other than humans, which are collected in a surrounding environment;

wherein the control unit includes an emergency situation control unit configured to determine that a situation in question is an emergency situation when an abnormality occurs in the environmental sound data other than human voices collected by the reception unit, an exigency situation control unit configured to determine that a situation in question is an exigency situation when a specific term indicative of danger is included in the voices, and a data control unit configured to secure and update data stored in the DB; and wherein the emergency situation control unit, when the environmental sound data received by the reception unit is included in stability data learned in advance and stored, determines that a situation in question is in a calm state and decreases an emergency situation data index, and, when the environmental sound data received by the reception unit is not included in stability data learned in advance and stored, increases the emergency situation data index and transmits an alarm signal to an alarm drive unit when a final value of the emergency situation data index reaches a predetermined maximum emergency situation index value.

2. The emergency and exigency situation notification system of claim 1, wherein the data control unit receives sounds in a calm and normal state from an environment in which the emergency and exigency notification system is installed, obtains or updates the stability data, and acquires or updates terms representative of danger.

3. The emergency and exigency situation notification system of claim 1, wherein the exigency situation control unit compares the sound data received by the reception unit with exigency data indicative of exigency situations stored in advance, and, when the received sound data does not contain a specific term indicative of danger, determines that a situation in question is in a calm state and decreases an exigency situation data index, and, when the received sound data contains a specific term indicative of danger, increases the exigency situation data index and transmits an alarm signal to the alarm drive unit when a value of the exigency situation data index reaches a predetermined maximum exigency situation index value.

4. The emergency and exigency situation notification system of claim 3, wherein the exigency situation control unit assigns a weight to the exigency situation data index when it is determined that a pitch of the sound data is trembling, high tone, or high decibel.

5. The emergency and exigency situation notification system of claim 1, wherein the emergency and exigency situation notification system is provided as at least one of equipment installed inside a building, a program of a computer, and an application of a mobile phone.

6. A method of providing notification of an emergency and an exigency situation using the emergency and exigency situation notification system of claim 1, the method comprising:

(a) a method in which the emergency situation control unit, when the environmental sound data received by the reception unit is included in stability data learned in advance and stored, determines that a situation in question is in a calm state and decreases an emergency situation data index, and, when the environmental sound data received by the reception unit is not included in stability data learned in advance and stored, increases the emergency situation data index and transmits an alarm signal to an alarm drive unit when a final value of the emergency situation data index reaches a predetermined maximum emergency situation index value; and/or (b) a method in which the exigency situation control unit compares the sound data received by the reception unit with exigency data indicative of exigency situations stored in advance, and, when the received sound data does not contain a specific term indicative of danger, determines that a situation in question is in a calm state and decreases an exigency situation data index, and, when the received sound data contains a specific term indicative of danger, increases the exigency situation data index and transmits an alarm signal to the alarm drive unit when a value of the exigency situation data index reaches a predetermined maximum exigency situation index value.

\* \* \* \* \*